United States Patent [19]

Baldacci et al.

[11] Patent Number: 4,937,131
[45] Date of Patent: Jun. 26, 1990

[54] CUSHIONING DUNNAGE PAD WITH STITCHING PERFORATIONS

[75] Inventors: Bruno H. Baldacci, Novelty; John E. Silvis, Fairport, both of Ohio

[73] Assignee: Ranpak Corp., Willoughby, Ohio

[21] Appl. No.: 324,242

[22] Filed: Mar. 15, 1989

[51] Int. Cl.⁵ .......................... B32B 3/10; D06N 7/04
[52] U.S. Cl. ................................. 428/131; 428/153;
428/154; 428/126; 428/127; 428/129; 428/77;
428/51; 206/814; 162/362; 162/116; 162/117;
156/209; 156/252
[58] Field of Search ............... 428/153, 154, 131, 126,
428/127, 129, 77, 51; 410/155; 267/140.3;
206/814; 162/362, 116, 117; 156/209, 252

[56] References Cited

U.S. PATENT DOCUMENTS

| 304,418 | 9/1884 | Fletcher | 428/153 |
| 1,410,879 | 3/1922 | Bither | 156/206 |
| 1,989,794 | 2/1935 | Duvall | 428/102 |
| 2,882,802 | 4/1959 | Walker | 93/1 |
| 3,238,852 | 3/1966 | Schur et al. | 93/1 |
| 3,323,983 | 6/1967 | Palmer et al. | 162/362 |
| 3,377,224 | 4/1968 | Gresham et al. | 156/209 |
| 3,478,141 | 11/1969 | Dempsey et al. | 156/209 X |
| 3,509,797 | 5/1970 | Johnson | 93/1 |
| 3,509,798 | 5/1970 | Johnson | 93/1 |
| 3,603,216 | 9/1971 | Johnson | 93/1 WZ |
| 3,655,500 | 4/1972 | Johnson | 93/1 |
| 3,799,039 | 3/1974 | Johnson | 93/1 WZ |
| 4,026,198 | 5/1977 | Ottaviano | 93/1 WZ |
| 4,109,040 | 8/1978 | Ottaviano | 428/129 |
| 4,307,141 | 12/1981 | Walbrum | 428/154 X |
| 4,376,671 | 3/1983 | Schulz | 162/362 X |
| 4,557,716 | 12/1985 | Ottaviano | 493/464 |
| 4,650,456 | 3/1987 | Armington | 493/464 |
| 4,717,613 | 1/1988 | Ottaviano | 428/129 |
| 4,750,896 | 6/1988 | Komaransky et al. | 493/357 |
| 4,806,410 | 2/1989 | Armington et al. | 428/126 |
| 4,839,210 | 6/1989 | Komaransky et al. | 428/77 |

FOREIGN PATENT DOCUMENTS

| 669488 | 8/1963 | Canada | 162/116 |
| 446552 | 3/1935 | United Kingdom | 162/117 |

Primary Examiner—Ellis P. Robinson
Assistant Examiner—William P. Watkins, III
Attorney, Agent, or Firm—Baldwin, Egan & Fetzer

[57] ABSTRACT

A flexible, cushioning dunnage product producible on a converter mechanism from a roll of sheet-like stock material, such as biodegradable paper. As the stock material is pulled off the roll by the converter, the edges of the stock material are rolled inwardly to form pillow-like portions which are urged by the converter mechanism laterally inwardly with respect to one another into confronting abutting relation, with the pillow-like portions being then connected together along their engaged abutting sides by in the preferred embodiment, transversely extending coined sections extending transversely of the product and defining a generally central connecting portion running in a direction lengthwise of the product. The lateral, spaced pillow-like portions possess considerable resiliency and thickness as compared to the coined central connecting portion, and perforations are provided in the connecting portion to aid the overlapped coined sections in preventing opening up or separation of the connecting portion, and thus such perforations aid in maintaining the pad-like form of the product for packaging or packing.

15 Claims, 1 Drawing Sheet

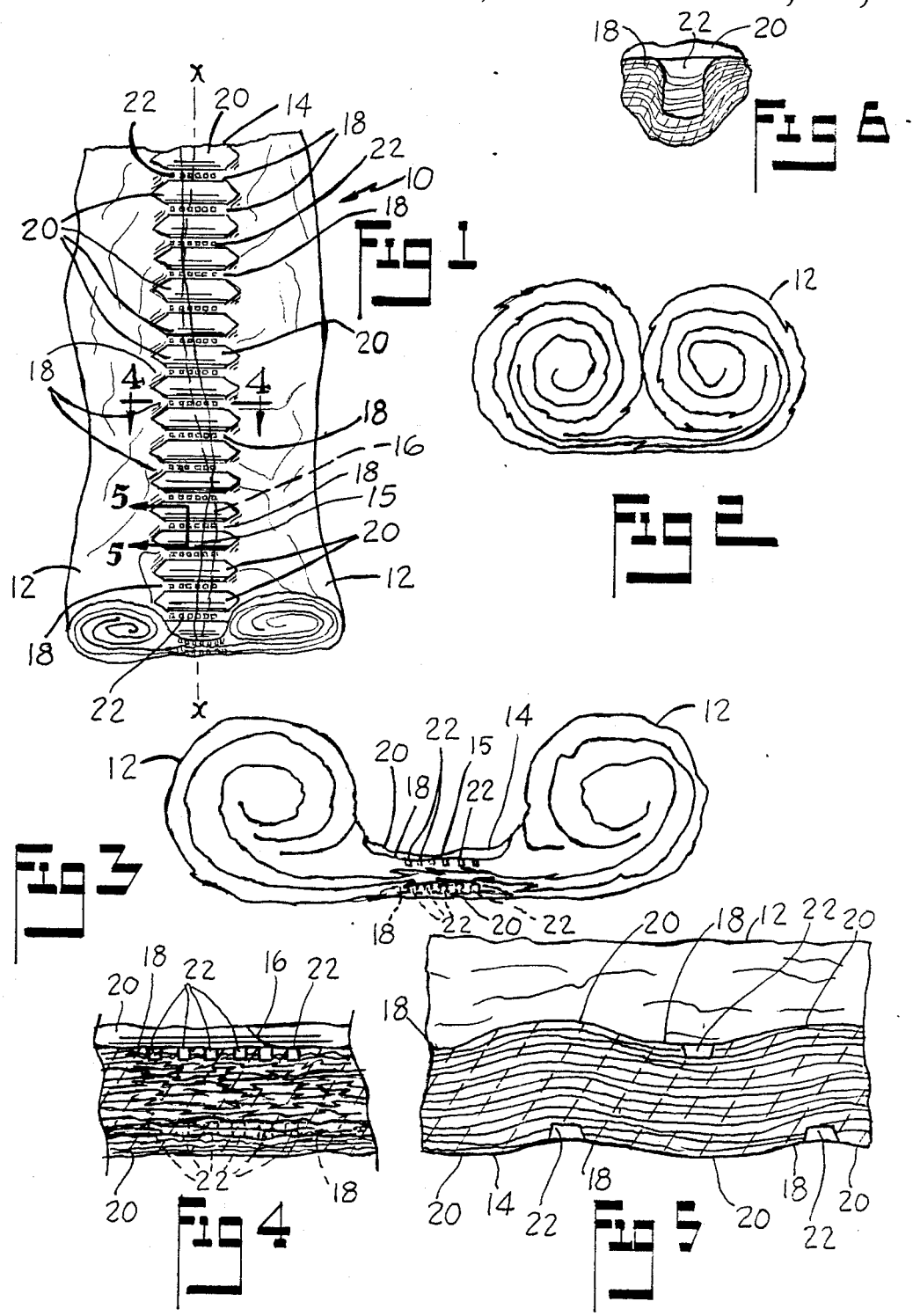

CUSHIONING DUNNAGE PAD WITH STITCHING PERFORATIONS

This invention relates in general to a flexible cushioning dunnage product for use as packaging or packing material and is referred to in the art as cushioning dunnage, and more particularly relates to a flexible cushioning dunnage product formed of lateral pillow-like or pillow-shaped portions and a central connecting portion running lengthwise of the product and connecting the pillow-like portions together. The invention provides a cushioning dunnage product of the latter type which includes perforations therein disposed along the central connecting portion of the product, for aiding the central connecting portion in preventing opening up or separation of the connecting portion, and thus aiding in maintaining the pad-like or pad-shaped form of the product.

BACKGROUND OF THE INVENTION

Cushioning dunnage product comprising resilient lateral pillow-like portions and a central reduced thickness connecting portion running lengthwise of the pad-like product, is well known in the art. U.S. Pat. Ser. No. 3,655,500 dated April 11, 1972 to G. R. Johnson and entitled A Resilient Cushioning Dunnage Product For Use In Packaging And Packing; U.S. Pat. Ser. No. 4,109,040 dated Aug. 22, 1978 to Gary W. Ottaviano and entitled Cushioning Dunnage Product Produced From Cushioning Dunnage Mechanism; and U.S. Pat. Ser. No. 4,717,613 dated Jan. 5, 1988 to Gary W. Ottaviano and entitled Mechanism And Method For Producing Cushioning Dunnage, disclose known flexible resilient pad-like dunnage products formed from web or sheet stock material and comprising lateral resilient pillow-like portions connected along a central portion of the pad lengthwise thereof, together with methods and apparatuses for producing the same.

There are many other prior art patents disclosing cushioning dunnage producing mechanisms and methods for producing a flexible resilient pad-like cushioning dunnage product of the general type of the present invention, such as shown for instance in U.S. Pat. Ser. No. 3,509,798 dated May 5, 1970 to G. R. Johnson and entitled Mechanism And Method For Producing Cushioning Dunnage; U.S. Pat. Ser. No. 3,603,216 dated Sept. 7, 1971 to G. R. Johnson entitled Method For Producing Cushioning Dunnage, and relating to a method of producing a resilient cushioning dunnage product of the general type aforediscussed; U.S. Pat. Ser. No. 3,799,039 dated Mar. 26, 1974 to G. R. Johnson entitled Cushioning Dunnage Mechanism And Method, and disclosing a cushioning dunnage producing mechanism for producing a cushioning dunnage product of the general type of the present invention; U.S. Pat. Ser. No. 4,026,198 dated May 31, 1977 to Gary W. Ottaviano entitled Cushioning Dunnage Mechanism, Transfer Cart Therefor, And Method, and disclosing a cushioning dunnage producing mechanism operable for producing a cushioning dunnage product of the general type of the present invention; and U.S. Pat. Ser. No. 4,750,896 dated June 14, 1988 entitled Method And Mechanism For Producing Cushioning Dunnage Product, and disclosing a flexible pad-like cushioning dunnage product of the general type as that of the present invention. U.S. Pat. Ser. No. 4,650,456 dated Mar, 17, 1987 to Steven E. Armington entitled Mechanism For Producing Pad-Like Cushioning Dunnage Product From Sheet Material With Separate Stock Roll Cart, discloses a further arrangement of converter mechanism and associated stock roll mounting cart, for producing a cushioning dunnage product of the general type of the present invention. These prior art patents of applicants' assignee are incorporated herein by reference.

While coining and/or adhesive means have been utilized in these prior art arrangements, for connecting or holding the pillow-like or pillow-shaped portions of the pad-like product together into pad-like form, to applicants' knowledge, no one heretofore has utilized perforations to aid in the holding or securement of the central connecting portion of the pad-like product, for maintaining the pad-like or pad-shaped form of the product.

SUMMARY OF THE INVENTION

The present invention provides a novel cushioning dunnage product produced from flexible sheet-like or web-like stock material, such as biodegradable paper, wherein the edges of the stock material are rolled inwardly to form pillow-like or pillow-shaped portions, with the pillow-like portions being connected together along their engaged abutting sides in the preferred form, by transversely extending coined portions extending transversely of the product and defining a generally central connecting portion running in a direction lengthwise of the product, and wherein perforations are provided in the connecting portion to aid the coined portions in preventing opening up or separation of the connecting portion; thus such perforations aid in maintaining the pad-like or pad-shaped form of the product.

Accordingly, an object of the invention is to provide a novel cushioning dunnage product produced in flexible strip form, for use as a packing or packaging material.

Another object of the invention is to provide a cushioning dunnage product formed from a multi-ply stock roll of stock material rotatably mounted on a converter mechanism, and wherein the product comprises lateral pillow-like portions and a central connecting portion running lengthwise of the product, and with there being provided perforations in the connecting portion to aid the latter in preventing opening up or separation of the connecting portion.

A still further object of the invention is to provide a cushioning dunnage product of the aforementioned type wherein the perforations comprise a plurality of individual perforations formed in spaced rows extending transversely of the product along said central connecting portion thereof, and wherein the perforations extend into the connecting portion from exteriorly thereof generally perpendicularly to a general horizontal plane passing through the lengthwise axis of said connecting portion, and with the perforations extending into said connecting portion from the top side of said connecting portion being staggered with respect to the perforations extending into said connecting portion from the underside thereof, in a direction lengthwise of the product.

Another object of the invention is to provide a biodegradable cushioning dunnage product of the aforementioned type which is readily recyclable and/or reusable, thus enhancing the economic and environmental factors involved in the production and use of such product.

Other objects and advantages of the invention will be apparent from the following description taken n conjunction with the accompanying drawings wherein:

BRIEF DESCRIPTION OF THE DRAWINGS

FIG. 1 is a generally diagrammatic, perspective illustration of a strip of the produced pad-like or padshaped product embodying the invention;

FIG. 2 is a diagrammatic illustration of the inward rolling of the lateral edges of multi-ply superimposed flexible webs of stock material, which lateral edges are rolled inwardly to form pillow-like portions, which are urged laterally into abutting engagement with one another generally as shown, and then are connected together along their engaged abutting sides by, in the preferred embodiment, transversely extending coined sections extending transversely of the product and defining a generally central connecting portion running in a direction lengthwise of the product, and as illustrated for instance in FIG. 1 and FIG. 3;

FIG. 3 is a diagrammatic illustration of the pad-like product after the pillow-like portions are connected together along their engaged abutting sides by the aforementioned coining, the latter forming transversely extending coined portions extending transversely of the product and defining a generally central connecting portion running in a direction lengthwise of the product, and with FIG. 3 illustrating the perforations disposed along the central connecting portion;

FIG. 4 is an enlarged, diagrammatic vertical sectional view taken generally along the plane of line 4—4 of FIG. 1, and illustrating the preferred orientation of the perforations in the central connecting portion of the product;

FIG. 5 is an enlarged, sectional view taken generally along the plane of line 5—5 of FIG. 1, looking in the direction of the arrows, and illustrating the staggered relationship in a direction lengthwise of the product, between the perforations on the top side of the product as compared to the perforations on the underside of the product in the connecting portion thereof, and also illustrating the staggered relationship of the flat or valley sections of the connecting portion on the top side and the underside; and FIG. 6 is an enlarged, vertical sectional view of one of the perforations illustrated for instance in FIG. 4, and showing the overlapped edges of the layers of stock material into which is formed the perforation in the connecting portion of the product, which overlapping and associated preferred coining aids in securing the central connecting portion against opening up, thus aiding in maintaining the pad-like form of the flexible product.

DESCRIPTION OF PREFERRED EMBODIMENT

Referring now again to the drawings, FIG. 1 illustrates a pad-like or pad-shaped cushioning dunnage product 10 embodying the invention, and adapted for use in packaging or packing. The product may be formed from web or sheet stock material, such as for instance biodegradable paper sheet, or the like, with the lateral edges of the sheet or web having been generally loosely rolled inwardly, and forming crumpled and resilient pillow-like or pillow-shaped portions 12 defining the lateral extremities of the elongated pad, together with means connecting the confronting rolled edges of the pillow-like portions together along the generally central portion 14 of the pad-like or pad-shaped product lengthwise thereof.

The connecting means in the preferred embodiment comprises a generally central coined section extending lengthwise of the pad-like product and stitching together (FIGS. 1 and 3) the overlapped abutting coined edges 15 and 16 (FIG. 1) of the formed pillow-like portions of the pad-like product, thus stitching together the confronting overlapped coined edges of the pillow-like portions. The latter edges are generally disposed in generally random overlapped relation as illustrated, along the central compressed coined connecting portion 14 of the pad-like product.

The laterally arranged pillow-like or pillow-shaped portions 12 of the pad-like cushioning product possess considerable resiliency, each being of a substantially greater thickness than the central coined portion 14. The coining of the product produces flat or valley sections 18 with intermediate rise sections 20, with the rise sections projecting outwardly from the level of the associated flat or valley section, and as clearly shown for instance in FIGS. 4 and 5. As can be best seen in FIG. 5, the valley sections and the flat sections on the upper or top side of the connecting portion 14 of the pad-like product are staggered with respect to the respective valleys and flats on the underside of the pad-like product in a direction lengthwise of the product.

In accordance with the invention, perforations 22 are provided extending inwardly into the connecting portion 14 of the product generally perpendicular to a generally horizontal plane passing through the lengthwise axis X—X (FIG. 1) of the connecting portion 14, such perforations piercing the underlying layers of the connecting portion and aiding the transversely extending coined portions of the product in maintaining the product in its pad-like form, or in other words aiding in attempting to prevent the inadvertent opening up or separation of the overlapped coined edge portions 15 and 16 of the product.

As can be best seen from FIG. 6, during piercing of the underlying layers of stock material and formation of the perforations in the connecting portion 14, the edges of the perforated stock material layers into which the respective perforation 22 extends, are forced into pressured overlap with respect to one another and thus create a substantial holding together for resisting separation of the overlapped coined edge portions of the pillow-like sections of the product.

The perforations in the central connecting portion 14 are preferably formed from a plurality of individual perforations disposed in rows extending transversely of the product along the central connecting portion thereof, and disposed furthermore in the flat sections of the central coined connecting portion of the product, and as illustrated.

The pad-like product may be formed on converters of the types aforediscussed in the Background Of The Invention section and may utilize for formation thereof a multi-ply, for instance, tri-ply roll of nominal 30 pound kraft biodegradable paper sheet, such rolls being conventionally approximately 30 inches in width and formed of three superimposed generally equal width sheets of nominal 30 pound kraft paper.

The embodiment of formed pad-like product produced that embodies the invention has a density of approximately 0.6 to 0.7 pounds per cubic foot, with the produced cushioning pad product being approximately eight to nine inches wide, and with the pillow-like portions being approximately two to two and one-half inches thick, and with the central coined and apertured portion of the pad-like product being between approximately one and one-half to approximately two inches in width and approximately one-half to three fourths of an inch in thickness, in the embodiment illustrated. It will be understood, however, that pad-like cushioning dunnage products possessing other dimensional relationships between the specified portions thereof and embodying the invention may also be produced.

From the foregoing description and accompanying drawings, it will be seen that the invention provides a novel pad-like or pad-shaped cushioning dunnage product comprising lateral pillow-like or pillow-shaped portions and a central preferably coined connecting portion, and wherein perforations are provided along the central coined portion, to aid in preventing opening up or separation of the connecting portion of the product and thus aid the coined sections of the connecting portion in maintaining the pad-like form of the produced dunnage product, and thus facilitating recycling or reuse of the product.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A cushioning dunnage product comprising a flexible pad-like article for use in packaging or the like, formed from a web or sheet of stock material with the lateral edges of the web or sheet having been generally loosely rolled inwardly and forming crumpled pillow-like portions defining the lateral extremities of said product, and means connecting the rolled confronting edges of the pillow-like portions together along a central connecting portion of said product lengthwise thereof, the last mentioned means comprising transversely extending coined portions of said confronting edges, the latter being in generally overlapped relation at said central connecting portion, said laterally arranged pillow-like portions of said article possessing considerable resiliency as compared to said connecting portion, said coined portions including valley sections and rise sections, each of said pillow-like portions being of a substantially greater thickness than said central connecting portion, and characterized by said valley sections of said central connecting portion including perforations therein extending into said connecting portion from exteriorly thereof generally perpendicularly to a generally horizontal plane passing through the lengthwise axis of said connecting portion and aiding said coined portions in maintaining the product in its pad-like form, said perforations are defined by edges of the perforated stock material layers into which a respective perforation extends, said edges being oriented into pressured overlap with respect to one another creating a substantial holding together for resisting separation of the coined overlapped edges of the pillow-like portions of the product.

2. A dunnage product in accordance with claim 1 wherein said perforations comprise a plurality of individual perforations formed in spaced rows extending transversely of said product along said central connecting portion thereof.

3. A dunnage product in accordance with claim 1 wherein said central connecting portion includes a top side and an underside, and said perforations extend into said connecting portion both from said top side and from said underside.

4. A dunnage product in accordance with claim 3 wherein said perforations extending into said connecting portion from said top side are staggered with respect to the perforations extending into said connecting portion from said underside in a direction lengthwise of said product.

5. A dunnage product in accordance with claim 1 wherein said valley sections consist of generally flat coined areas extending transversely of said dunnage product and spaced with respect to one another lengthwise of said product with a respective said rise section disposed intermediate each pair of said flat areas.

6. A dunnage product in accordance with claim 5 wherein said central connecting portion includes a top side and an underside, and wherein said valley sections and said rise sections appear on both said top side and said underside, with said valley sections on said top side being staggered with respect to said valley sections on said underside in a direction lengthwise of said product.

7. A dunnage product in accordance with claim 1 wherein said web or sheet of stock material is comprised of biodegradable paper.

8. A dunnage product in accordance with claim 1 wherein said product is formed of three superimposed paper webs or sheets of nominal 30 pound kraft paper, with the lateral edges of said superimposed webs or sheets being generally simultaneously rolled inwardly to form said product.

9. A dunnage product in accordance with claim 8 having a produced product density of approximately 0.6 to 0.7 pounds per cubic foot and wherein each of said webs or sheets is approximately 30 inches in width prior to being rolled inwardly to form said product, said produced product being approximately eight to nine inches wide with said pillow-like portions each being approximately two to two and one-half inches thick.

10. A dunnage product in accordance with claim 9 wherein said central connecting portion is approximately one-half to three-fourths of an inch in thickness.

11. A dunnage product in accordance with claim 9 wherein said central connecting portion consists of multiple, crumpled and coined layers of the stock material, with said central connecting portion being between approximately one and one-half to approximately two inches in width and approximately one-half to three-fourths of an inch in thickness.

12. A cushioning dunnage product comprising a flexible pad-like article for use in packaging or the like, formed from a web or sheet of stock material with the lateral edges of the web or sheet having been generally loosely rolled inwardly and forming crumpled pillow-like portions defining the lateral extremities of said product, and means connecting the rolled confronting edges of the pillow-like portions together along a central connecting portion of said product lengthwise therein, the last mentioned confronting edges being generally flattened and disposed in generally overlapped relation at said central connecting portion, said central portion including valley sections and rise sections, said laterally arranged pillow-like portions of said article possessing considerable resiliency as compared to said connecting portion, each of said pillow-like portions being of a substantially greater thickness than said central connecting portion, and characterized by said valley sections of said central connecting portion including perforations therein extending into said connecting portion from exteriorly thereof, generally perpendicularly to a generally horizontal plane passing through the lengthwise axis of said connecting portion and aiding said connecting portion in maintaining the product in its pad-like form, said perforations are defined by edges of the perforated stock material layers into which a respective perforation extends, said edges being oriented into pressured overlap with respect to one another creating a substantial holding together for resisting separation of the coined overlapped edges of the pillow-like portions of the product.

13. A dunnage product in accordance with claim 12 wherein said perforations comprise a plurality of individual perforations formed in spaced rows extending transversely of said product along said valley sections of said central connecting portion thereof.

14. A dunnage product in accordance with claim 12 wherein said central connecting portion includes a top side and an underside, and said perforations extend into said connecting portion both from said valley sections of said top side and from said underside.

15. A dunnage product in accordance with claim 1 wherein said central connecting portion comprises multiple layers of the crumpled stock material.

* * * * *